United States Patent
Acker et al.

(10) Patent No.: US 10,218,788 B2
(45) Date of Patent: Feb. 26, 2019

(54) HIGH SPEED COMMUNICATION PROTOCOL

(71) Applicant: SAP SE, Walldorf (DE)

(72) Inventors: Michael Acker, Grossfischlingen (DE); Markus Tolksdorf, Rauenberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/292,793

(22) Filed: Oct. 13, 2016

(65) Prior Publication Data

US 2017/0034275 A1    Feb. 2, 2017

Related U.S. Application Data

(63) Continuation of application No. 14/454,257, filed on Aug. 7, 2014, now Pat. No. 9,560,136.

(51) Int. Cl.
*H04L 29/08* (2006.01)
*H04L 29/06* (2006.01)
*G06F 15/173* (2006.01)

(52) U.S. Cl.
CPC .... *H04L 67/1097* (2013.01); *H04L 29/08045* (2013.01); *H04L 67/2804* (2013.01); *H04L 67/42* (2013.01); *H04L 69/326* (2013.01); *G06F 15/17331* (2013.01); *H04L 67/28* (2013.01)

(58) Field of Classification Search
CPC .................................................. H04L 67/1097
USPC ....................................................... 709/203
See application file for complete search history.

(56) References Cited

U.S. PATENT DOCUMENTS

| | | | | |
|---|---|---|---|---|
| 5,305,317 | A * | 4/1994 | Szczepanek | H01R 13/665 370/257 |
| 5,519,640 | A * | 5/1996 | Ganesan | G10L 19/012 704/E19.006 |
| 6,072,771 | A * | 6/2000 | Anderson | H04L 12/6418 370/216 |
| 6,415,373 | B1 * | 7/2002 | Peters | G06F 11/1076 348/E5.008 |
| 6,898,604 | B1 | 5/2005 | Ballinger et al. | |
| 6,941,510 | B1 | 9/2005 | Ozzie et al. | |
| 6,999,998 | B2 * | 2/2006 | Russell | G06F 15/167 709/213 |
| 7,010,779 | B2 | 3/2006 | Rubin et al. | |
| 7,051,042 | B2 | 5/2006 | Krishnaprasad et al. | |

(Continued)

OTHER PUBLICATIONS

Braden, "Requirements for Internet Hosts—Communicaiton Layers", RFC1122, 1989.*

(Continued)

*Primary Examiner* — Ondrej C Vostal
(74) *Attorney, Agent, or Firm* — Fish & Richardson P.C.

(57) ABSTRACT

The present disclosure involves systems, software, and computer implemented methods for providing high speed communication between a sending system and a receiving system. One computer-implemented method includes determining, by a computer, that data is available for serialization using a pointer transfer; getting a data block of the data from a memory; getting metadata corresponding to the data block; writing an original address of the data block to a transport layer; writing the data block to the transport layer; determining that the data corresponding to the data block contains pointers; and adding a referenced data block to one or more data blocks to be transferred to a receiving system.

20 Claims, 8 Drawing Sheets

(56) References Cited

U.S. PATENT DOCUMENTS

| | | | |
|---|---|---|---|
| 7,159,030 B1* | 1/2007 | Elzur | H04L 47/10 370/389 |
| 7,165,239 B2 | 1/2007 | Hejlsberg et al. | |
| 7,210,097 B1 | 4/2007 | Clark et al. | |
| 7,246,358 B2 | 7/2007 | Chinnici et al. | |
| 7,263,697 B2 | 8/2007 | Acker et al. | |
| 7,281,218 B1 | 10/2007 | Runge et al. | |
| 7,406,695 B2 | 7/2008 | Dattke et al. | |
| 7,441,185 B2 | 10/2008 | Coulson et al. | |
| 7,500,017 B2 | 3/2009 | Cseri et al. | |
| 7,567,992 B1 | 7/2009 | Edwardson et al. | |
| 7,614,051 B2 | 11/2009 | Glaum et al. | |
| 7,647,415 B1 | 1/2010 | Sandoz et al. | |
| 7,688,819 B2* | 3/2010 | Ramaiah | H04L 45/02 370/389 |
| 7,711,775 B2 | 5/2010 | Tavis et al. | |
| 7,870,549 B2 | 1/2011 | Acker et al. | |
| 8,001,127 B2 | 8/2011 | Chandrasekar et al. | |
| 8,090,731 B2 | 1/2012 | Sthanikam et al. | |
| 8,091,086 B1 | 1/2012 | Ershov et al. | |
| 8,171,452 B2 | 5/2012 | Crasovan et al. | |
| 8,214,329 B2* | 7/2012 | Gilder | G06F 17/30566 707/622 |
| 8,218,555 B2* | 7/2012 | Minami | H04L 29/06 370/401 |
| 8,291,230 B2* | 10/2012 | Moore | H04L 9/3236 709/206 |
| 8,341,286 B1* | 12/2012 | Craft | H04L 69/161 370/229 |
| 8,397,158 B1 | 3/2013 | nethi et al. | |
| 8,493,381 B1 | 7/2013 | Touma et al. | |
| 8,533,692 B2 | 9/2013 | Crasovan et al. | |
| 8,539,513 B1* | 9/2013 | Starr | G06F 9/45533 709/227 |
| 8,595,696 B2 | 11/2013 | Maximilien et al. | |
| 8,612,530 B1 | 12/2013 | Sapovalovs et al. | |
| 8,825,900 B1* | 9/2014 | Gross, IV | H04L 47/31 709/238 |
| 8,886,840 B2* | 11/2014 | Fujimori | H04L 49/352 709/249 |
| 9,135,285 B1 | 9/2015 | Johnson et al. | |
| 9,641,432 B2* | 5/2017 | Jha | H04L 45/74 |
| 2001/0054172 A1 | 12/2001 | Tuatini et al. | |
| 2002/0107903 A1* | 8/2002 | Richter | H04L 29/06 709/201 |
| 2003/0037181 A1* | 2/2003 | Freed | G06F 9/4862 719/328 |
| 2004/0015666 A1* | 1/2004 | Rojas | G06F 5/12 711/159 |
| 2004/0049769 A1* | 3/2004 | Lueh | G06F 11/3419 717/158 |
| 2004/0139212 A1 | 7/2004 | Mikherjee et al. | |
| 2004/0205331 A1* | 10/2004 | Hussain | G06F 21/72 713/153 |
| 2004/0220946 A1* | 11/2004 | Krishnaprasad | G06F 17/3092 |
| 2004/0255046 A1 | 12/2004 | Ringseth et al. | |
| 2005/0005233 A1 | 1/2005 | Kays et al. | |
| 2005/0044197 A1 | 2/2005 | Lai et al. | |
| 2005/0229244 A1* | 10/2005 | Khare | H04L 63/12 726/13 |
| 2005/0234986 A1* | 10/2005 | Terek | G06F 9/4493 |
| 2006/0005122 A1 | 1/2006 | Lemoine et al. | |
| 2006/0041661 A1 | 2/2006 | Erikson et al. | |
| 2006/0047780 A1 | 3/2006 | Patnude et al. | |
| 2006/0143350 A1 | 6/2006 | Miloushev et al. | |
| 2006/0167900 A1 | 7/2006 | Pingte et al. | |
| 2006/0236224 A1 | 10/2006 | Kuznetsov et al. | |
| 2006/0294312 A1 | 12/2006 | Walmsley et al. | |
| 2007/0005786 A1 | 1/2007 | Kumar et al. | |
| 2007/0011333 A1* | 1/2007 | Lau | H04L 69/28 709/227 |
| 2007/0074127 A1 | 3/2007 | Acker et al. | |
| 2007/0130282 A1 | 6/2007 | Ryan et al. | |
| 2007/0294679 A1* | 12/2007 | Bobrovsky | G06F 9/45516 717/146 |
| 2008/0126824 A1* | 5/2008 | Lee | H04L 47/10 713/502 |
| 2008/0140770 A1 | 6/2008 | DelloSTritto et al. | |
| 2008/0154938 A1 | 6/2008 | Cheslow et al. | |
| 2008/0178278 A1 | 7/2008 | Grinstein et al. | |
| 2008/0228860 A1 | 9/2008 | Angelov et al. | |
| 2009/0328014 A1* | 12/2009 | Kejariwal | G06F 8/41 717/140 |
| 2010/0070448 A1 | 3/2010 | Omoigui et al. | |
| 2010/0162104 A1 | 6/2010 | Acker et al. | |
| 2010/0179940 A1* | 7/2010 | Gilder | G06F 17/30566 707/622 |
| 2010/0191814 A1* | 7/2010 | Heddes | G06F 15/16 709/206 |
| 2010/0241828 A1* | 9/2010 | Yu | G06F 8/456 712/30 |
| 2010/0287247 A1 | 11/2010 | Kohring et al. | |
| 2011/0153834 A1* | 6/2011 | Bharrat | G06F 11/1482 709/227 |
| 2011/0283179 A1 | 11/2011 | De Magalhaes et al. | |
| 2012/0143919 A1 | 6/2012 | Idicula et al. | |
| 2012/0159132 A1* | 6/2012 | Abel | G06F 9/3885 712/229 |
| 2012/0166669 A1* | 6/2012 | Price | H04L 29/06027 709/231 |
| 2012/0254262 A1 | 10/2012 | Kimber et al. | |
| 2012/0278479 A1 | 11/2012 | Miller et al. | |
| 2013/0055225 A1* | 2/2013 | Ravi | G06F 8/4441 717/150 |
| 2013/0212165 A1 | 8/2013 | Vermeulen et al. | |
| 2014/0180737 A1 | 6/2014 | Acker et al. | |
| 2014/0214398 A1 | 7/2014 | Sanders et al. | |
| 2014/0254598 A1* | 9/2014 | Jha | H04L 45/74 370/392 |
| 2014/0279893 A1* | 9/2014 | Branton | G06F 17/30994 707/634 |
| 2015/0032804 A1 | 1/2015 | Fablet et al. | |
| 2015/0052521 A1 | 2/2015 | Raghu et al. | |
| 2015/0127789 A1* | 5/2015 | Lissack | H04L 41/5022 709/221 |
| 2015/0201016 A1* | 7/2015 | Golander | H04L 67/1097 709/212 |
| 2015/0277899 A1 | 10/2015 | Hamby et al. | |
| 2015/0286511 A1 | 10/2015 | Mickens et al. | |
| 2015/0293962 A1* | 10/2015 | van Oortmerssen | G06F 17/30345 707/756 |
| 2016/0103783 A1* | 4/2016 | Allen | H04L 12/6418 709/212 |

OTHER PUBLICATIONS

Microsoft Computer Dictionary, "inline processing", 5th edition, 2002, pp. 273-274.*
Postel, "Transmission Control Protocol", RFC793, 1981.*
Gagnon et al., "Effective Inline-Threaded Interpretation of Java Bytecode Using Preparation Sequences", pp. 182-196, 2003.*
Gopalakrishna et al., "Efficient Intrusion Detection using Autmation Inlining", 2005.*
James et al., "Design of the Kan distributed object system", 2000.*
Janista, "Deterministic Parallelization of Object-Oriented Code Through Out-of-order Execution", 2012.*
Khatiwala et al., "Data Sandboxing: A Technique for Enforcing Confidentiality Policies", 2006.*
Kono et al., "Efficient RMI: Dynamic Specialization of Object Serialization", 2000.*
Lindsey et al., "JavaTech", "inline", p. 405, 2018.*
Lhotak et al., "Run-time evaluation of opportunities for object inlining in Java", 2005.*
Lipasti et al., "Physical Register Inlining", 2004.*
Semeria et al., "Resolution, Optimization, and Encoding of Pointer Variables for the Behavioral Synthesis from C", 2001.*
Stack Overflow, "inlining", 2018.*

(56) References Cited

OTHER PUBLICATIONS

Wikipedia, "inline function", 2018.*
Wikipedia, "serialization", 2018.*
Dean et al., "Towards Better Inlining Decisions Using Inlining Trials", 1994 (Year: 1994).*
Linux, Linux manual pages, "xdr—library routines for external data representations", 2007 (Year: 2007).*
Shepler et al., "Network File System (NFS) Version 4 Minor Version 1 Protocol", RFC 5661, 2010 (Year: 2010).*
Sun Microsystems, "XDR: External Data Representation Standard", RFC 1014, 1987 (Year: 1987).*
Wikipedia, "External Data Representation", 2018 (Year: 2018).*
Allen et al., "Chapter25: Web Service Standards and Extensions", "Pro ASP.NET 1.1 in VB.NET", 2005.
Bhatti et al., "Object Serialization and Deserialization Using XML", 2000.
Boer et al., "Meta Lex: Legislation in XML", 2002.
Breg et al., A Customizable Implementation of RMI for High Performance Computing—, 2000.
Chalouf et al., "SSLNP: Secure Service Level Negotiation Protocol", 2009.
Chinosi et al., "BPMN: An introduction to the standard", 2011.
Cowan et al., "XML Information Set (Second Edition)", 2004.
Damiani et al., "Towards Securing XML Web Services", 2002.
Decker et al., The Semanitc Web: The Roles of XML and RDF, 2000.
Dierks et al., The Transport Layer Security (TLS) Protocol Version 1.2, RFC 5246, 2008.
Dierks et al..,,T he Transport Layer Security (TLS) Protocol Version 1.1, RFC 4346, 2006.
El-Hassan et al., "A High-Performance Architecture of an XML Processor for SIP-based Presence", 2009.
Gorski et al., "Service Security Revisited", 2014.
Gruschka et al., "Security for XML Data Binding", 2010.
Hericko et al., "Java and Distributed Object Models: An Analysis", 1998.
Kangasharju, "XML Messaging for Mobile Devices", 2008.
Khring et al., "Non-Blocking Signature of very large SOAP Messages", 2007.
Lu et al., "A Parallel Approach to XML Parsing", 2006.
Maeda, "Performance Evaluation of Object Serialization Libraries in XML, JSON and Binary Formats", 2012.
Mealling, The IETF XML Registry, RFC 3688, 2004.
Motik et al., "XML Serialization", 2008.
Nakhimovsky et al., "Web Programming: Web Applications and Web Services with JSP and ASP", p. 11, 2002.
Payrits et al., "Metadata-Based XML Serialization for Embedded C++", 2006.
Reagle, "XML Signature Requirements", RFC 2807, 2000.
Roof et al., "Chapter 14: Working with XML", The Definitive Guide to the .NET Compact Framework, 2003.
Sahai et al., "Web Services in the Enterprise", "Chapter 2 Overview of Web Services", 2005.
Sarukkai, "Foundations of Web Technology", "Chapter 9 Web Services", 2002.
Sauter et al., "End-to-End Communication Architecture for Smart Grids", 2010.
Shemitz, "Chapter14: Serialization and Remoting", NET 2.0 for Delphi Programmers, 2006.
Slominski et al., "Design of an XML based Interoperable RMI System SoapRMI C++/ Java 1.1", 2001.
Van Engelen et al., An Overview and Evaluation of Web Services Security Performance Optimizations, 2008.
Van Engelen et al., The gSOAP Toolkit for Web Services and Peer-To-Peer Computing Networks, 2002.
White et al., "Mastering XML Premium Edition", 2001.
Wilde, "XML Technologies Dissected", 2003.
Williams et al., "VOTable: A Proposed XML Format for Astronomical Tables", 2002.
Zhao, XML-based Frameworks for Internet Commerce and an Implementation of B2B e-procurement, 2001.

* cited by examiner

HIGH SPEED COMMUNICATION PROTOCOL

CROSS REFERENCE TO RELATED APPLICATION AND CLAIM OF PRIORITY

This application is a continuation of, and claims priority under 35 USC § 120 to U.S. patent application Ser. No. 14/454,257, filed on Aug. 7, 2014, entitled "High Speed Communication Protocol", the entire contents of which are hereby incorporated by reference.

TECHNICAL FIELD

The present disclosure relates to computer-implemented methods, software, and systems for providing high speed communication between a sending system and a receiving system.

BACKGROUND

A computing system can communicate with one or more other computing systems over a network. Communication components associated with the computing system and/or the network can be grouped according to layers. For example, layers can include application, presentation, session, transport, network, data link, and physical layers. Each layer can be associated with one or more functions. For example, the application layer can interact with software applications that implement a communicating component and the transport layer can provide the functional and procedural means of transferring variable-length data sequences from a source to a destination host via one or more networks, while maintaining the quality of service functions. In general, a given layer can provide one or more services to a layer above the given layer, and can consume one or more services provided by a layer below the given layer.

SUMMARY

The present disclosure involves systems, software, and computer implemented methods for sending data from a sending system to a receiving system. One computer-implemented method includes: starting a process, by operation of computer, the process missing actual data required for the process to complete; creating a proxy data object as a substitute for the actual data to allow the process to execute; executing the process using the proxy data object until the actual data is required for the process to continue execution; replacing the proxy data object with the actual data; and continuing to execute the process with the actual data.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein writing the data to the transport layer comprises adapting the data corresponding to the data block to requirements of a receiving system.

A second aspect, combinable with any of the previous aspects, comprising determining whether data is available upon a determination that the data corresponding to the data block does not contain pointers.

A third aspect, combinable with any of the previous aspects, comprising receiving the one or more data blocks to be transferred.

A fourth aspect, combinable with any of the previous aspects, comprising: determining, by a computer, that data is available in the one or more data blocks; getting a data block corresponding to the data from the transport layer; getting the metadata corresponding to the data block; and writing the data corresponding to the data block to a memory area of the receiving system.

A fifth aspect, combinable with any of the previous aspects, comprising: determining, by a computer, that an unadapted pointer is available; getting an original pointer value; finding a data block where an original address equals the original pointer value; and changing the unadapted pointer value to the address of the found data block.

A sixth aspect, combinable with any of the previous aspects, wherein the metadata contains information about a memory layout of the data and data type information, including code page, floating point formats, and decimal places.

A seventh aspect, combinable with any of the previous aspects, wherein one or more of the pointers are indirect pointers, the one or more indirect pointers each linked by zero or more other indirect pointers to a direct pointer that refers to a data block.

An eighth aspect, combinable with any of the previous aspects, wherein the metadata is transferred to the receiving system.

The subject matter described in this specification can be implemented in particular implementations so as to realize one or more of the following advantages. Data can be sent from a sending system to a receiving system without repeatedly sending metadata describing the data to be sent, thus increasing transmission speed and reducing transmission payload. Data including one or more pointers can be sent from a sending system to a receiving system and the pointer-associated data can be adapted on the receiving system. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Communication protocols can be designed for data transfer between communication partners that may have different hardware, different data representations, and other differences. When using these communication protocols, data can be transformed by a sending system from a source format to a common, intermediate format before being sent. The intermediate format can be, for example, XML (eXtensible Markup Language), JSON (JavaScript™ Object Notation), or some other format. The data in the intermediate format can be sent from the sending system to a receiving system. The receiving system can transform the data in the intermediate format to data in a target format before the data is stored or otherwise used on the receiving system. Such transformation results in additional processing and transmission time. Additionally, the intermediate format generally includes metadata which describes each item of data that is being transferred. The metadata increases the size of the data that is transferred (e.g., the size of the data in the intermediate format is generally larger than the size of the data in the source format).

Some communication partners are homogeneous, in that data used on the sending system is in a same format as data that is used on a receiving system. Such communication partners may communicate using repeated same or similar messages. For such types of communication, a high speed communication protocol can be used in which an initial set of metadata is communicated between the communication partners and is only re-transferred when necessary. Data can be transferred in a compact, binary form over a long lasting connection. When possible, data can be sent without any transformation. In certain cases, data may be transformed when necessary. The high speed communication protocol can provide the fast transfer advantages of a binary bus-like transfer along with some transformation features, such as mapping of data types and code pages and adaption of pointers.

Figure 1:
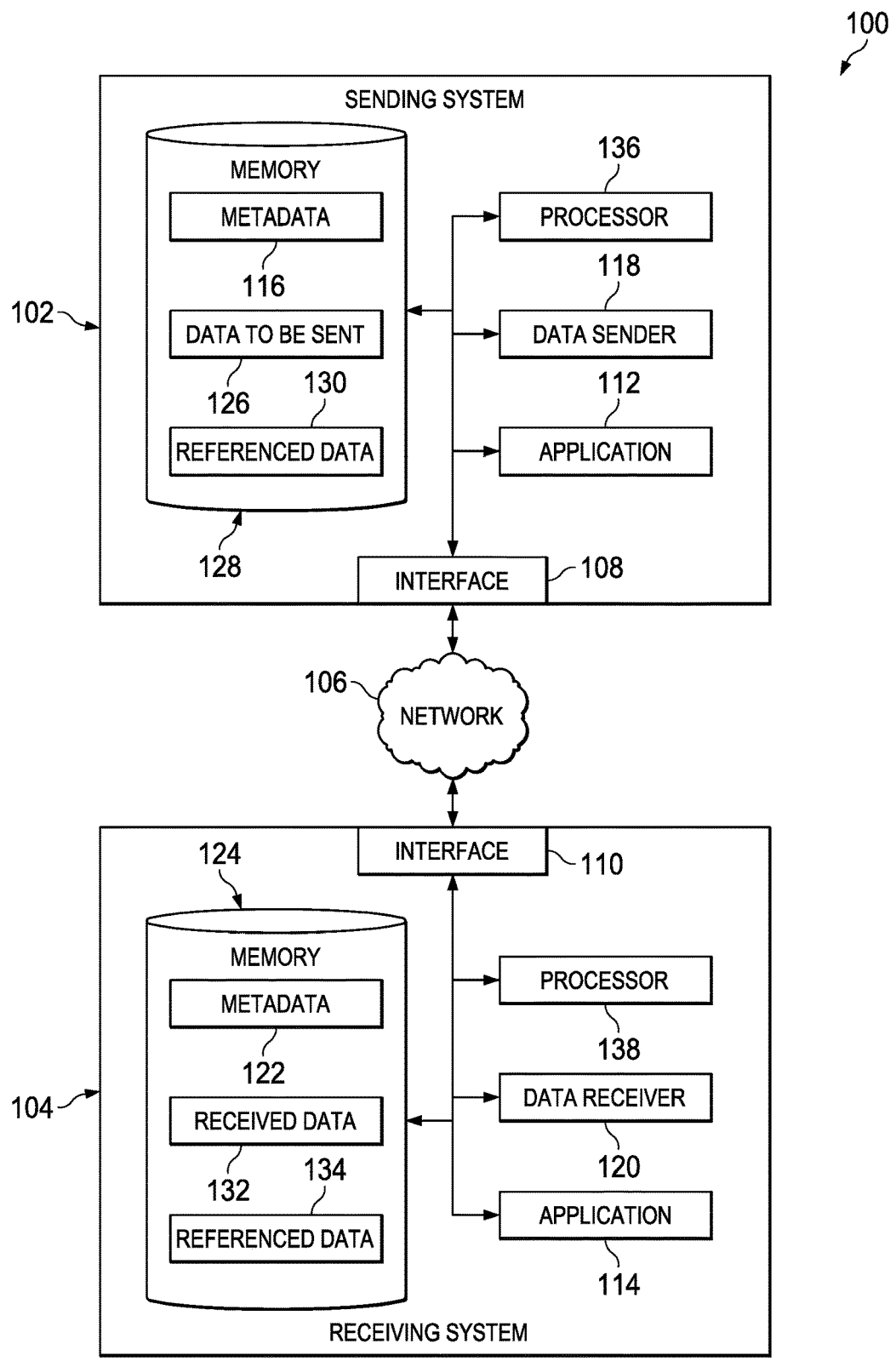
FIG. 1 is a high-level block diagram of an example distributed computing system (EDCS) according to an implementation.

FIG. 1 is a high-level block diagram of an example distributed computing system (EDCS) 100 according to an implementation. The EDCS 100 includes a sending system 102 and a receiving system 104 communicating over a network 106. Interfaces 108 and 110 are used by the sending system 102 and the receiving system 104, respectively, for communicating with other systems in a distributed environment, such as within the EDCS 100 over the network 106.

An application 112 executing on the sending system 104 can be configured to send data to an application 114 executing on the receiving system 104. In some implementations, the sending system 102 is a client computing device, the application 112 is a client application, the receiving system 104 is a server computing device, and the application 114 is a server application. In some implementations, the sending system 102 is a server computing device, the application 112 is a server application, the receiving device 104 is a client computing device, and the application 114 is a client application. In some implementations, both the sending system 102 and the receiving system 104 are server computing devices and both the application 112 and the application 114 are server applications.

The sending system 102 (e.g., the application 112) can, for example, invoke a service or remote procedure call implemented by the receiving system 104 and can transfer data from the memory 128 to the receiving system 104. The receiving system 104 can send a result of the call back to the sending system 102. An asynchronous service call can be invoked in which data is transferred from the sending system 102 to the receiving system 104 with the call being a non-blocking call which returns to the sending system 102 before the servicing of the asynchronous service call is finished. The asynchronous call can include a unique identifier associated with the invocation. A response and service call result which includes the unique identifier can be sent later, asynchronously, from the receiving system 104 to the sending system 102, after the servicing of the service call has completed.

The application 112 can be configured to repeatedly generate a service message of the same type that is repeatedly sent to the application 114. Using a communication protocol in which the same metadata is repeatedly sent can be inefficient and unnecessary (e.g., the same metadata may be unnecessarily transferred multiple times). The application 112 can instead be configured to use a high speed communication protocol in which metadata 116 on the sending system 102 is sent once (e.g., initially) for a communication process or service and is only resent when necessary, such as when a change occurs in the format of data to be sent from the sending system 102 to the receiving system 104.

A data sending component 118 can include a timestamp (or some other identifier that uniquely identifies a version and data structure(s) associated with the service) associated with the metadata 116 when sending the metadata 116 to the receiving system 104. A data receiving component 120 can store the received metadata as metadata 122 in memory 124, along with the timestamp. The data sending component 118 can include the timestamp associated with the metadata 116 in each communication sent to the receiving system 104. The data receiving component 120 can compare the received timestamp to a stored timestamp to determine whether the stored metadata is current. For example, when the metadata 116 changes, the data sending component 118 can generate a new timestamp associated with the updated metadata and can send the new timestamp in subsequent communications. The data receiving component 120 can detect that the received timestamp is different than the stored timestamp and can send a request to the sending system 102 to send updated metadata. As another example, the sending system 102 can send the updated metadata to the receiving system 104 upon an update to the metadata 116.

The metadata 116 can include information about a memory layout of data to be sent 126 in memory 128 of the sending system 102. For example, the metadata 116 can include data type information, including code page, floating point formats, "endianness" of data (big-endian or little-endian), and decimal place information for the data to be sent 126. The metadata 116 can also include information about one or more pointers that are included in the data to be sent 126. A pointer in the data to be sent 126 can refer to another block of data, such as a block of data that is included in the data to be sent 126 or to another block of data that is included in another area of memory (e.g., represented by referenced data 130). A block of data in the referenced data 130 can also include one or more pointers, such as to another block of referenced data 130.

In some implementations, the metadata 116 is sent from the sending system 102 and stored as metadata 122 on the receiving system. In some implementations, metadata is exchanged between systems. That is, in addition to the metadata 116 being sent to the receiving system, metadata (e.g., metadata 122) can be sent from the receiving system 104 (to the sending system 102) which describes a memory layout for received data on the receiving system 104. A timestamp associated with the metadata exchange can be stored, on each system, in association with the respective exchanged metadata. The timestamp can be included with future communications sent between the sending system 102 and the receiving system 104 and can be evaluated to determine whether the exchanged metadata is current.

In some implementations, one set of metadata is sent to or exchanged with the receiving system 104. In some implementations, multiple sets of metadata are sent or exchanged between the receiving system 104 and the sending system 102. For example, the sending system 102 and the receiving system 104 may communicate using a set of several service calls. A set of metadata can be sent or exchanged for each service call included in the set of service calls.

The data sending component 118 can, when sending the data to be sent 126, copy the data to be sent directly 126 from the memory 128 to a transport layer used by the interface 108. That is, a binary representation of data stored in the memory 128 can be directly copied from the memory to the transport layer. Such copying of binary data can save time and space and can prevent data loss, as compared to sending non-binary data. For example, some communication protocols send data as text, with binary data in memory being copied to text values before being sent. Such transformations take time and generally increase the amount of data to be sent. Additionally, data can be lost, such as when transforming a floating point number to a representation including a set of decimal characters.

In some implementations and for some sets of data, the data sending component 118 can transform or otherwise process some of the data to be sent 126 on the sending system 102 before the data is sent to the receiving system 104. For example, when the sending system 102 uses a longer character representation (e.g., UTF16 (Unicode Transformation Format 16-bit)) than the receiving system 104 (e.g., ASCII (American Standard Code for Information Interchange) 8-bit), characters can be transformed on the sending system 102 before sending to reduce the size of the transferred data. Other data transformations can be performed, such as when the sending system 102 uses a data type that is not supported on the receiving system 104. The data sending component 118 can transform data to a data type that is supported by the receiving system 104, before data is sent.

Other processing before sending is possible. For example, data that is not needed on the receiving system 104 can be excluded from being transferred. For example, when a structure in the data to be sent 126 has more fields than a structure in a received data area 132 of the memory 124 on the receiving system 104, data in the fields that are included in the data to be sent 126 but not in the received data area 132 can be excluded from data sent to the receiving system 104.

The data sending component 118 can perform processing related to pointers that are included in the data to be sent 126. For example, the data sending component 118 can detect both direct and indirect pointers in the data to be sent 126, and can write associated address information to the transport layer along with referenced data 130 that is referred to either directly or indirectly by the detected pointer(s). As described in more detail below, the data sending component 118 can process pointers using either a pointer transfer process or an inlining process. A direct pointer is a memory address which points to some other data. An indirect pointer is, for example, a memory address that points to some other memory address, with the other memory address being an address of some other data. An indirect pointer can have more than one level of indirection. For example, a first indirect pointer can point to a second indirect pointer and the second indirect pointer can point to a third pointer, the third pointer being a direct pointer which points at some other data.

The data receiving component 120 can, using the interface 110, receive data sent from the sending system 102. The data receiving component can copy data from a transport layer associated with the interface 110 directly to the received data area 132. As discussed above, when transformation of data is needed, such transformations are generally performed on the sending system 102 before the data is sent. However, when necessary, the data receiving component 120 may transform some data before or after copying data from the transport layer to the received data area 132.

For example, received pointer-related data can be processed by the data receiving component 120. The data receiving component 120 can adapt one or more pointers to include a memory address associated with the memory 124 (e.g., such a pointer may have included a value associated with the memory 128 when the pointer data was sent). When needed, the data receiving component 120 can allocate memory for received data in the received data area 132 and/or in one or more referenced data areas 134. As described in more detail below, adaption of pointers can be performed for data received from a pointer transfer process or an inlining process.

As used in the present disclosure, the term "computer" is intended to encompass any suitable processing device. For example, although FIG. 1 illustrates a single sending system 102 and a single receiving system 104, the system 100 can be implemented using two or more sending systems 103 or two or more receiving systems 104. Indeed, the sending system 102 and the receiving system 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the sending system 102 and the receiving system 104 may be adapted to execute any operating system, including Linux, UNIX, Windows, Mac OS®, Java™, Android™, iOS or any other suitable operating system. According to one implementation, the sending system 102 and/or the receiving system 104 may also include or be communicably coupled with an e-mail server, a Web server, a caching server, a streaming data server, and/or other suitable server.

Generally, the interfaces 108 and 110 each comprise logic encoded in software and/or hardware in a suitable combination and operable to communicate with the network 106. More specifically, the interfaces 108 and 110 may each comprise software supporting one or more communication protocols associated with communications such that the network 106 or interface's hardware is operable to communicate physical signals within and outside of the illustrated system 100.

The sending system 102 includes one or more processors 136. Similarly, the receiving system 104 includes one or more processors 138. Each processor 136 or 138 may be a central processing unit (CPU), a blade, an application specific integrated circuit (ASIC), a field-programmable gate array (FPGA), or another suitable component. Generally, each processor 136 or 138 executes instructions and manipulates data to perform the operations of the sending system 102 or the receiving system 104, respectively. Specifically, each processor 136 executes the functionality required to send data to the receiving system 104 and each processor 138 executes the functionality to process data received from the sending system 102.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As mentioned, the sending system 102 includes the memory 128 and the receiving system 104 includes the memory 124. In some implementations, sending system 102 and/or the receiving system 104 include multiple memories. The memory 128 and the memory 124 may each include any type of memory or database module and may take the form of volatile and/or non-volatile memory including, without limitation, magnetic media, optical media, random access memory (RAM), read-only memory (ROM), removable media, or any other suitable local or remote memory component. The memory 128 and the memory 124 may each store various objects or data, including caches, classes, frameworks, applications, backup data, business objects, jobs, web pages, web page templates, database tables, database queries, repositories storing business and/or dynamic information, metadata, pointers, and any other appropriate information including any parameters, variables, algorithms, instructions, rules, constraints, or references thereto associated with the purposes of the sending system 102 or the receiving system 104, respectively.

The sending system 102 may generally be any computing device operable to connect to or communicate with the receiving system 104 via the network 106 using a wireline or wireless connection. In general, the sending system 102 comprises an electronic computer device operable to receive, transmit, process, and store any appropriate data associated with the system 100 of FIG. 1. The sending system 102 can include one or more client applications, including the application 112. The sending system 102 can include one or more client applications. A client application is any type of application that allows the sending system 102 to request and view content on the sending system 102. In some implementations, a client application can use parameters, metadata, and other information received at launch to access a particular set of data from the receiving system 104. In some instances, a client application may be an agent or client-side version of the one or more enterprise applications running on an enterprise server (not shown).

The sending system 102 can be, as mentioned, a server device. As another example, the sending system 102 can be a client device. A client device is generally intended to encompass any client computing device such as a laptop/notebook computer, wireless data port, smart phone, personal data assistant (PDA), tablet computing device, one or more processors within these devices, or any other suitable processing device. For example, a client device 104 comprises a computer that includes an input device, such as a keypad, touch screen, or other device that can accept user information, and an output device that conveys information associated with the operation of the receiving system 104, or the client device itself, including digital data, visual information, or a graphical user interface (GUI) (not shown).

A GUI of a client device can interface with at least a portion of the system 100 for any suitable purpose, including generating a visual representation of the application 112. In particular, the GUI may be used to view and navigate various Web pages. Generally, the GUI provides the user with an efficient and user-friendly presentation of business data provided by or communicated within the system. The GUI may comprise a plurality of customizable frames or views having interactive fields, pull-down lists, and buttons operated by the user. The GUI contemplates any suitable graphical user interface, such as a combination of a generic web browser, intelligent engine, and command line interface (CLI) that processes information and efficiently presents the results to the user visually.

The term "client", "client device" and "user" may be used interchangeably as appropriate without departing from the scope of this disclosure. While a client device can be described in terms of being used by a single user, this disclosure contemplates that many users may use one computer, or that one user may use multiple computers.

Figure 2A:
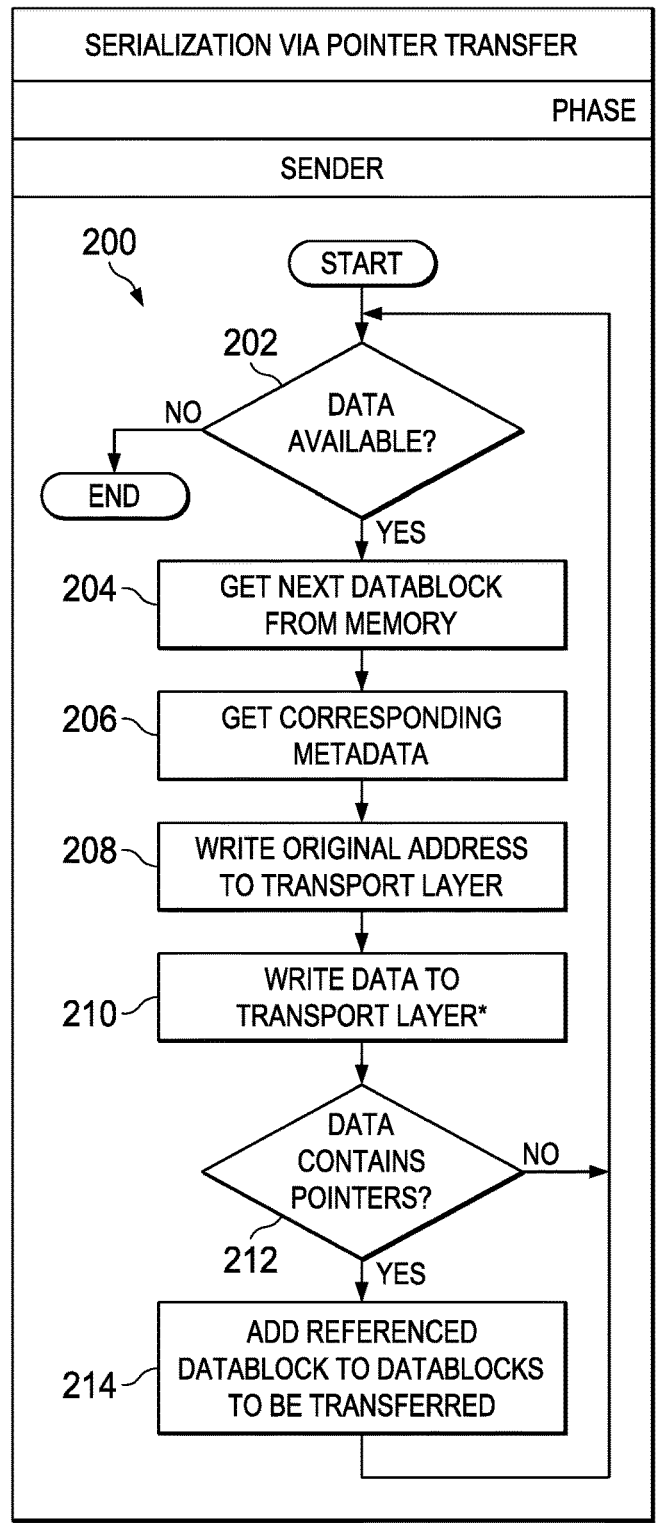
FIG. 2A is a flowchart of an example method for sending data to a receiving system using pointer transfer(s) according to an implementation.

FIG. 2A is a flowchart of an example method 200 for sending data to a receiving system using pointer transfer(s) according to an implementation. It will be understood that method 200 and related methods may be performed, for example, by any suitable system, environment, software, and hardware, or a combination of systems, environments, software, and hardware, as appropriate. For example, one or more of a client, a server, or other computing device can be used to execute method 200 and related methods and obtain any data from the memory of a client, the server, or the other computing device. In some implementations, the method 200 and related methods are executed by the sending system 102 of the EDCS 100 described above with respect to FIG. 1.

At 202, a determination is made as to whether data is available for serialization using a pointer transfer.

When data is available for serialization a first block of data is retrieved from a memory, at 204. For example, the memory can be a memory area of a sending system.

At 206, corresponding metadata is retrieved. For example, a size and data type of the first data block can be retrieved. In some implementations, step 206 is performed before step 204 (e.g., metadata for the first data block may be retrieved before the first data block is retrieved).

At 208, an original address of the first data block is optionally written to a transport layer. In some implementations, the original address of the first data block to be transferred is not written to the transport layer but original addresses of other data blocks processed at step 208 (e.g., via recursion, as described below) may be written to the transport layer.

At 212, a determination is made as to whether the first data block contains one or more pointers.

When the data block contains one or more pointers, one or more referenced data blocks are added, at 214, to one or more data blocks to be transferred to a receiving system.

After the referenced data block(s) are added, or when the first data block does not contain pointers, a determination is made as to whether additional data is available (e.g., at 202). When additional data is available, processing continues for the additional data (e.g., for a next data block) as described above for steps 204-214. When no additional data is available, method 200 stops.

Figure 2B:
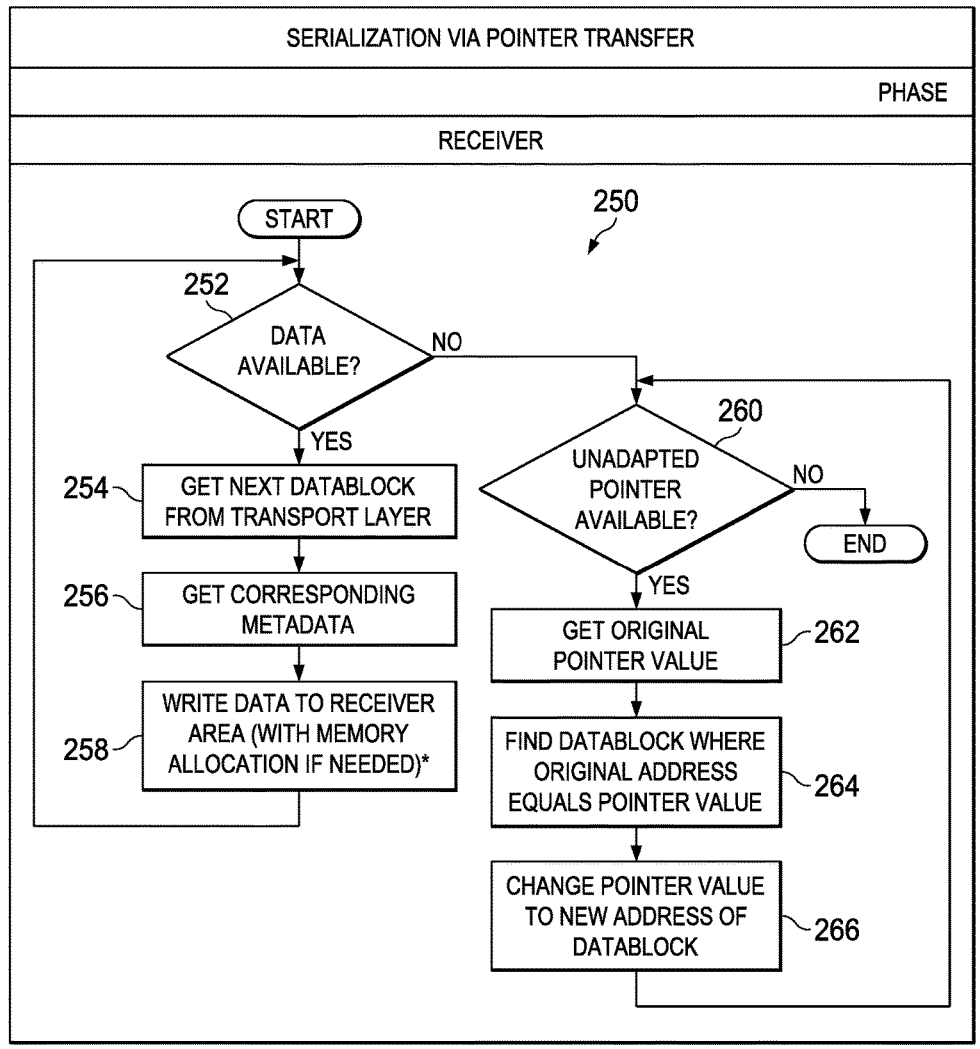
FIG. 2B is a flowchart of an example method for receiving pointer transfer data according to an implementation.

FIG. 2B is a flowchart of an example method 250 for receiving pointer transfer data according to an implementation. It will be understood that method 250 and related methods may be performed, for example, by any suitable system, environment, software, and hardware, or a combination of systems, environments, software, and hardware, as appropriate. For example, one or more of a client, a server, or other computing device can be used to execute method 250 and related methods and obtain any data from the memory of a client, the server, or the other computing device. In some implementations, the method 250 and related methods are executed by the receiving system 104 of the EDCS 100 described above with respect to FIG. 1.

At 252, a determination is made as to whether data is available. For example, a determination can be made as to whether data has been received from a sending system pointer transfer process.

When data is available, a first data block of the available data is retrieved, at 254, from a transport layer.

At 256, metadata corresponding to the first data block (and/or to the data expected from the pointer transfer process) is retrieved. The metadata can be evaluated, for example, to identify a receiving system memory layout corresponding to the pointer transfer. The receiving system memory layout can specify, for example, data type information including the location in the memory layout of zero or more pointer fields. In some implementations, step 256 is performed before step 254 (e.g., metadata for the first data block may be retrieved before the first data block is retrieved).

At 258, the data corresponding to the first data block is written to a memory area. For example, the data can be written to a receiving system memory area. When the first data block includes one or more pointers, a memory area can be allocated for each of the one or more pointers, with the size of an allocated memory area being determined from the retrieved metadata. The addresses of the allocated memory areas can be stored in association with the metadata.

After the data corresponding to the first data block is written to the memory area, a determination is made as to whether additional data is available (e.g., at 252). When additional data is available, processing continues for the additional data (e.g., for one or more next data blocks), as described above for steps 254, 256, and 258 for the first data block.

For example, a next data block can be retrieved, from the transport layer, at 254. Metadata corresponding to the next data block can be retrieved, at 256. The data of the next data block can be written to the receiver system memory, at step 258. When metadata corresponding to the next data block indicates that the next data block is a referenced data block, the next data block can be written to an allocated memory area that corresponds to the next data block. The address of the allocated memory area can be stored in metadata that is associated with the next data block.

When additional data is not available (e.g., at 252), a determination is made, at 260, as to whether a first unadapted pointer is available. For example, a determination can be made whether a first unadapted pointer is included in data written to the receiving system memory area.

When a first unadapted pointer is available, a first original pointer value associated with the first unadapted pointer is retrieved, at 262. The location of the first original pointer value within the memory area can be determined, for example, based on the retrieved metadata. The first original pointer value can be a value, for example, that was received from the transport layer.

At 264, a data block is found for which a first original address value equals the first original pointer value. For example, the first original address value can be or can be included in metadata associated with a first referenced data block included in data received from the transport layer.

At 266, the first unadapted pointer value is changed to the address of the found data block. The address of the found block can be determined for example, based on an address of a previously created memory area that is stored in metadata.

After the first unadapted pointer value is changed, a determination is made (e.g., at 260) as to whether an additional unadapted pointer is available. When an additional unadapted pointer is not available, the method 250 stops. When an additional unadapted pointer is available, processing continues for the additional unadapted pointer (e.g., a next unadapted pointer), as described above for steps 262, 264, and 266, for the first unadapted pointer.

Figure 3A:
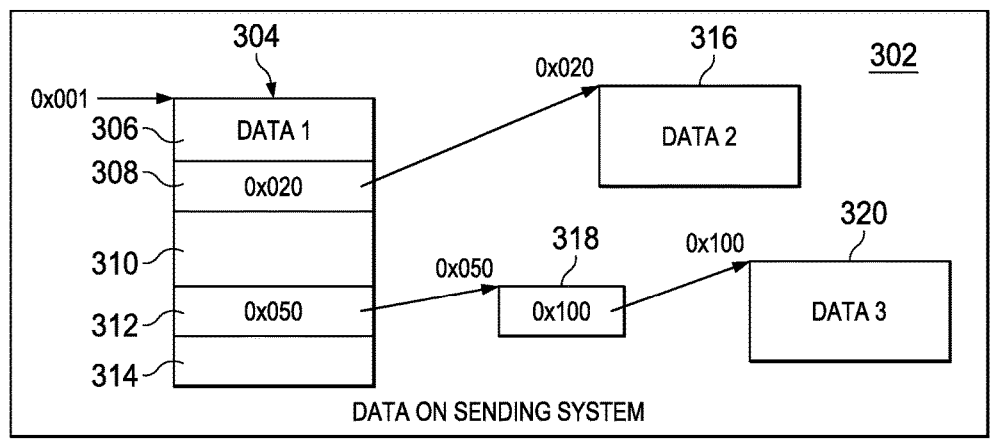
FIGS. 3A and 5A illustrate sending system memory areas according to an implementation.

FIG. 3A illustrates a sending system memory area 302. The sending system memory area 302 includes a data block 304 according to an implementation. The data block 304 includes a first data portion 306, a first direct pointer 308, a second data portion 310, an indirect pointer 312 and a third data portion 314. The first direct pointer 308 includes the address of (e.g., refers or points to) a first referenced data block 316. The indirect pointer 312 includes the address of (e.g., refers or points to) a second direct pointer 318. The second direct pointer 318 includes the address of (e.g., refers or points to) a second referenced data block 320.

Figure 3B:
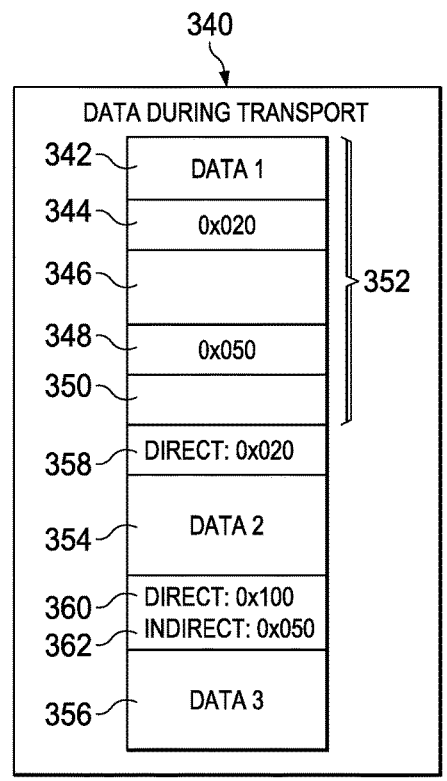
FIG. 3B illustrates a data block during transport according to an implementation.

FIG. 3B illustrates a data block 340 during transport according to an implementation. The data block 340 illustrates, for example, the transporting by a pointer transfer process of the data included in the sending system memory area 302 and data referred to (e.g., either directly or indirectly) by the pointers included in the sending system memory area 302. The data block 340 can be created, for example, by a sending system. A first data portion 342, a first direct pointer 344, a second data portion 346, an indirect pointer 348, and a third data portion 350 respectively correspond to the first data portion 306, the first direct pointer 308, the second data portion 310, the indirect pointer 312, and the third data portion 314.

As part of generating the data block 340, the sending system can access the data block 304, access metadata corresponding to the data block 304 (e.g., to identify layout information associated with the data block 304), and write the data from the data block 304 to a communications transport layer (e.g., as illustrated by a portion 352 of the data block 340).

The sending system can determine that data in the data block 304 includes pointers (e.g., the first direct pointer 308 and the indirect pointer 312). The sending system can, in response to identifying a pointer, write a referenced data block to the transport layer. For example, the data block 340 includes a first referenced data block 354 that corresponds to the first referenced data block 316 referred to by the first direct pointer 308 and a second referenced data block 356 that corresponds to the second referenced data block 320 that is indirectly referred to by the indirect pointer 312.

In some implementations, one or more pointer values are written to the transport layer before a referenced data block is written to the transport layer. For example, the data block 340 includes, before the first referenced data block 354, a pointer value 358 that is the original address of the first referenced data block 316 and is the value of the first direct pointer 308. As another example, the data block 340 includes, before the second referenced data block 356, a direct pointer value 360 and an indirect pointer value 362. The direct pointer value 360 corresponds to the address of the second referenced data block 320 (and to the value of the second direct pointer 318). As mentioned, the second referenced data block 356 corresponds to the second referenced data block 320. The indirect pointer value 362 corresponds to the indirect pointer 312. The indirect pointer value 362, the pointer value 358, the direct pointer value 360, the first referenced data block 354, and the second referenced data block 356 can be referenced in a pointer adaption process performed by a receiving system, as described in more detail below.

Figure 3C:
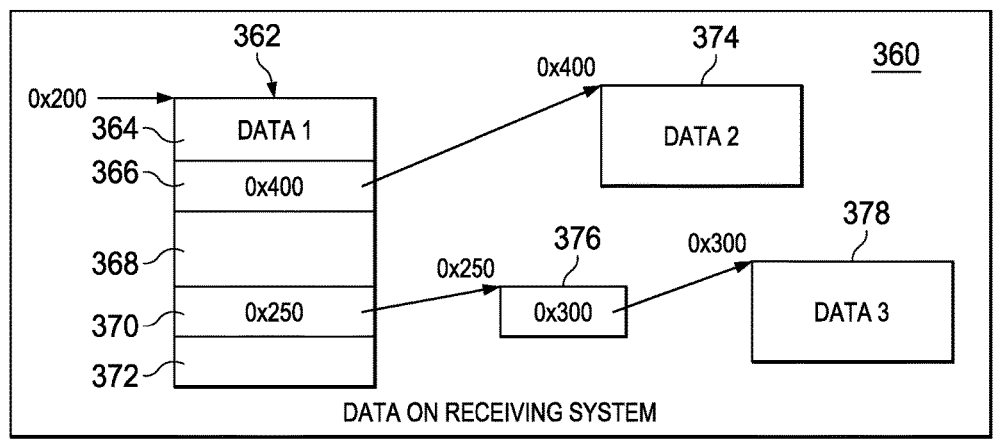
FIGS. 3C and 5C illustrate receiving system memory areas according to an implementation.

FIG. 3C illustrates a receiving system memory area 360 according to an implementation. The receiving system memory area 360 illustrates the results of receiving and processing the data block 340 on a receiving system. The receiving system can, for example, retrieve the portion 352 of the data block 340 from the transport layer, retrieve metadata corresponding to the data block 340, and write the portion 352 to the receiving system memory area 360, as illustrated by a populated memory area 362. The memory area 362 includes a first data portion 364, a first direct pointer 366, a second data portion 368, an indirect pointer 370, and a third data portion 372 that respectively correspond to the first data portion 306, the first direct pointer 308, the second data portion 310, the indirect pointer 312, and the third data portion 314, and to the first data portion 342, the first direct pointer 344, the second data portion 346, the indirect pointer 348 and the third data portion 350. As described below, the receiving system can adapt the first direct pointer 366 and the indirect pointer 370 to addresses of corresponding referenced data on the receiving system.

The receiving system can identify the pointer value 358 in the received data block 340, and in response to identifying the pointer value 358, can allocate a memory area 374 of the size of the first referenced data block 354 on the receiving system. The receiving system can write the contents of the first referenced data block 354 to the memory area 374. The receiving system can adapt the first direct pointer 366 to include the address of the allocated memory area 374 (e.g., an address value of "0x400").

The receiving system can identify the indirect pointer value 362 and the direct pointer value 360 in the received data block 340. In response to identifying the indirect pointer value 362, the receiving system can allocate a pointer memory area 376 on the receiving system of the size of a receiving system memory address. In response to identifying the direct pointer value 360, the receiving system can allocate a memory area 378 of the size of the second referenced data block 356. The receiving system can write the contents of the second referenced data block 356 to the memory area 378. The receiving system can copy the address of the memory area 378 (e.g., an address value of "0x300" to the pointer memory area 376. The receiving system can adapt the indirect pointer 370 to include the address of the pointer memory area 376 (e.g., an address value of "0x250").

Figure 4A:
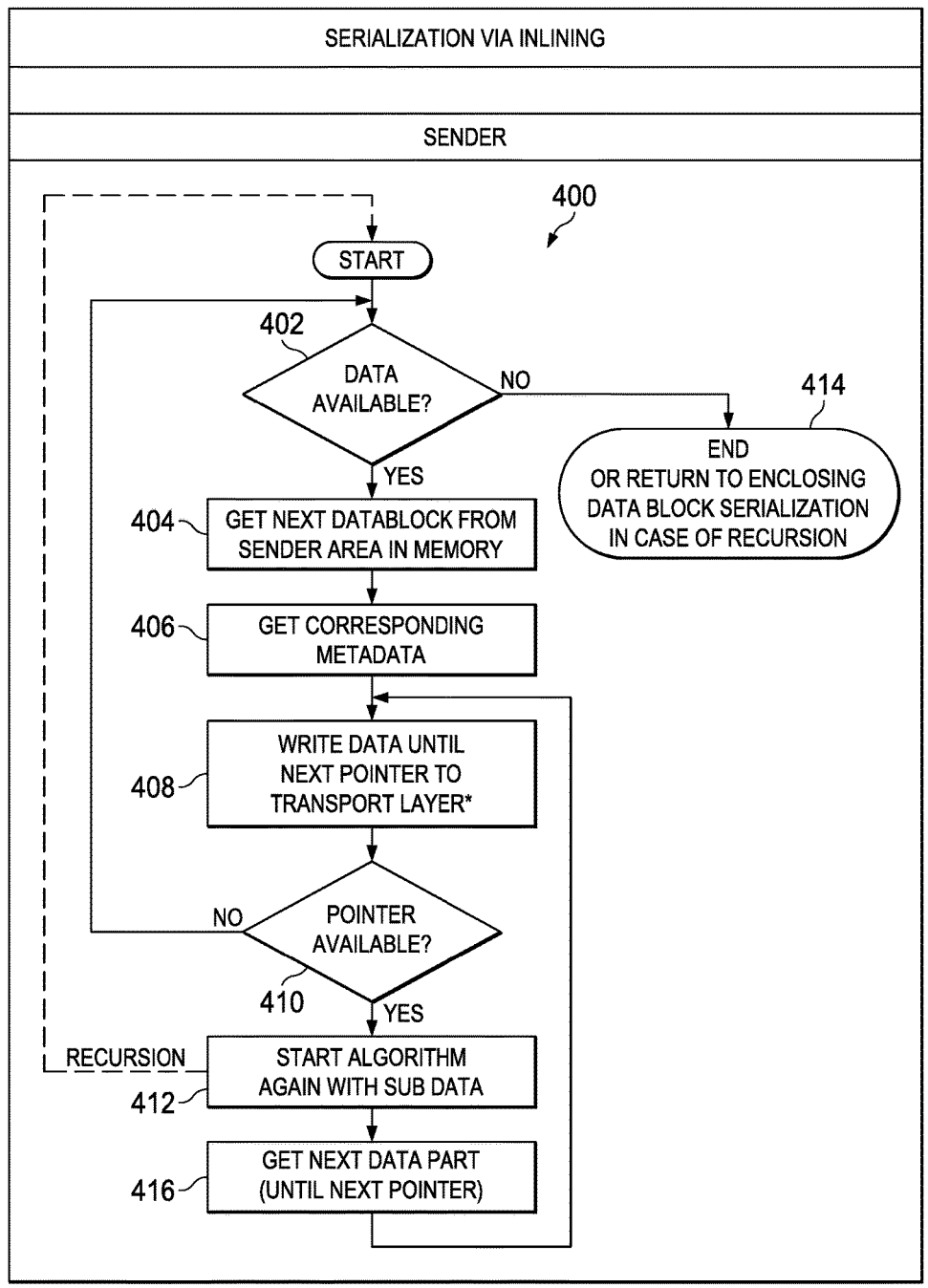
FIG. 4A is a flowchart of an example method for sending inlined data to a receiving system according to an implementation.

FIG. 4A is a flowchart of an example method 400 for sending inlined data to a receiving system according to an implementation. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by the sending system 102 of the EDCS 100 described above with respect to FIG. 1.

At 402, a determination is made as to whether data is available for serialization using an inlining transfer.

When data is available, a first data block is retrieved, at 404, from a sender area in memory.

At 406, corresponding metadata is retrieved. In some implementations, step 406 is performed before step 404 (e.g., metadata for the first data block may be retrieved before the first data block is retrieved from the sender area in memory).

At 408, a first portion of the first data block is written to the transport layer, starting at the beginning of the first data block and ending at a position corresponding to a found pointer value or ending when the end of the first data block is reached.

At 410, a determination is made as to whether a pointer is available (e.g., whether a pointer value was encountered in step 408). When a pointer value is not available, method 400 continues at 402, to determine whether additional data is available in the sender memory area. When additional data is available, method 400 continues, at 404, to process the additional data, as described above. When additional data is not available, method 400 either ends, at 414, or returns to the processing of an enclosing data block in a case of recursion. A recursion example is described below.

For example, when a pointer is available (e.g., at 410), a determination is made, at 412, to recursively restart the method 400 using sub data as the sender area in memory. For example, the method 400 can be restarted using the sender memory area that is referenced by the pointer encountered in step 408. Of note is that the value of the pointer is not written to the transport layer using the inlining transfer. When the processing for each sub data portion of a data block (and each sub data portion of a sub data portion, to possibly various levels) is completed, process 400 continues for the data block at 416. At 416, a next portion of the data block is retrieved from the transport layer, the next portion beginning at a position in the data block immediately after the last found pointer and ending at either a position corresponding to a next found pointer or the end of the next data block. Method 400 continues for the next portion of the data block, at 408.

Figure 4B:
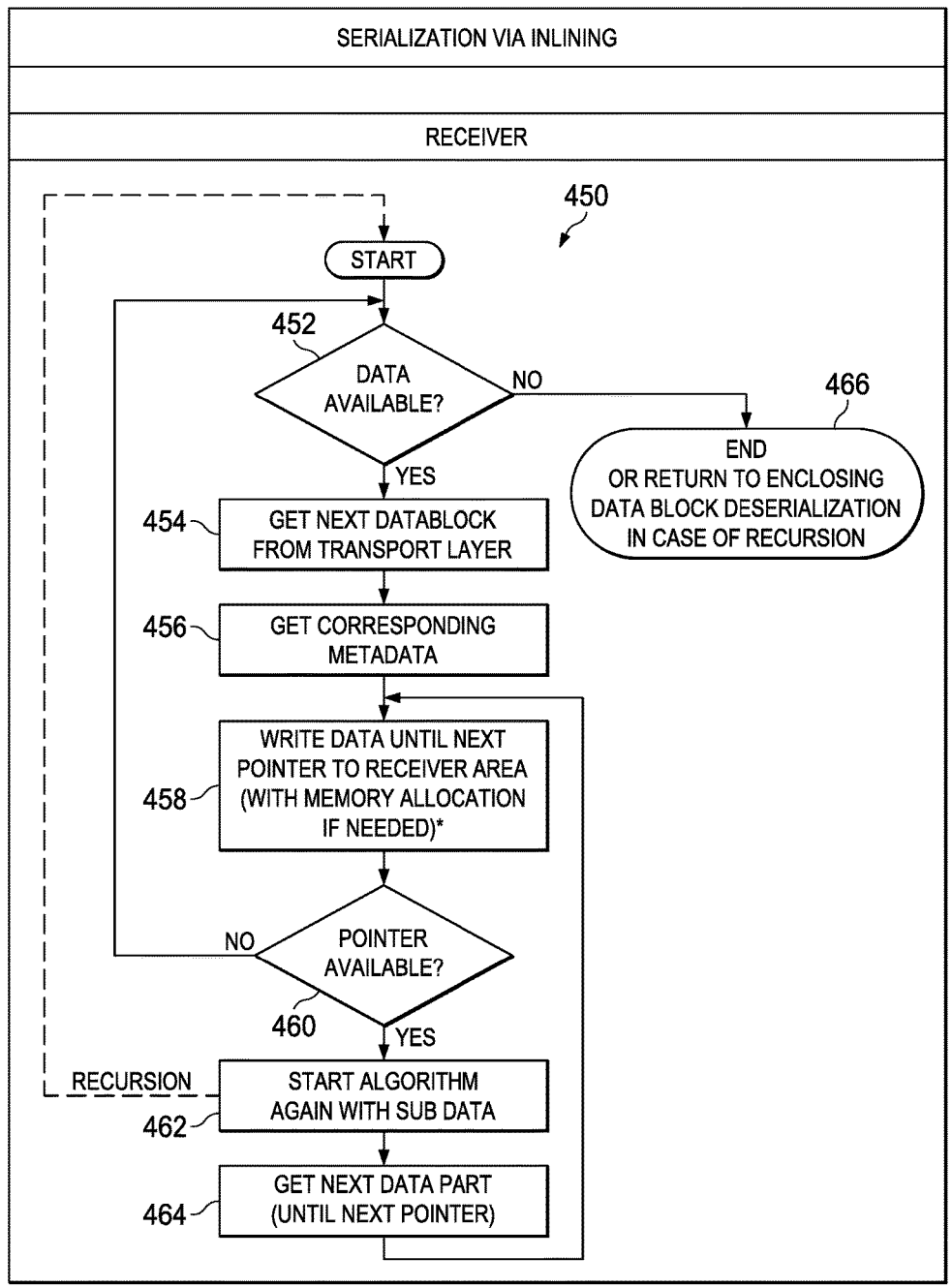
FIG. 4B is a flowchart of an example method for receiving inlined data according to an implementation.

FIG. 4B is a flowchart of an example method 450 for receiving inlined data according to an implementation. It will be understood that method 450 and related methods may be performed, for example, by any suitable system, environment, software, and hardware, or a combination of systems, environments, software, and hardware, as appropriate. For example, one or more of a client, a server, or other computing device can be used to execute method 450 and related methods and obtain any data from the memory of a client, the server, or the other computing device. In some implementations, the method 450 and related methods are executed by the receiving system 104 of the EDCS 100 described above with respect to FIG. 1.

At 452, a determination is made as to whether data is available. For example, a determination can be made as to whether data has been received from a sending system inline transfer process.

When data is available, a first data block corresponding to the available data is retrieved, at 454, from a transport layer.

At 456, metadata corresponding to the first data block (and/or to the data expected from the inline transfer process) is retrieved. The metadata can be evaluated, for example, to identify a receiving system memory layout corresponding to the inline transfer. The receiving system memory layout can specify, for example, data type information including the location in the memory layout of zero or more pointer fields.

At 458, the data corresponding to the first data block is written to a receiving system memory area. In some implementations, the receiving system memory area is preallocated. When the receiving system memory is preallocated and the first data block does not include any pointers, the data from the first data block can be written to the receiving system memory area until the end of the first data block is reached. When the receiving system memory area is preallocated and the first data block includes one or more pointers, a first portion of data from the first data block can be written to the receiving system memory area, the first portion beginning at the start of the first data block and ending at the location of the first pointer included in the first data block.

When the receiving system memory area is not preallocated and when the first data block does not include pointers, a memory area equal to the size of the first data block can be allocated and the data of the first data block can be written to the newly allocated memory area. When the receiving system memory area is not preallocated and when the first data block includes at least one pointer, a memory area equal to the size of the first data block can be allocated and a portion of data from the first data block can be written to the newly allocated memory area, the portion beginning at the start of the first data block and ending at the location of the first pointer included in the first data block.

At 460, a determination is made as to whether a pointer is available (e.g., whether the first data block includes at least one pointer). When a pointer is not available, method 450 continues at 452, to determine whether additional received data is available. When additional received data is available, method 450 continues, at 454, to process the next data block, as described above for the first data block. When additional received data is not available, method 450 either ends, at 466, or returns to the processing of an enclosing data block in a case of recursion. A recursion example is described below.

For example, when a pointer is available (e.g., at 460), a determination can be made, at 462, to recursively restart the method 450 using sub data. For example, at 452, a determination can be made that additional received data is available, the additional received data corresponding to a first referenced data block. At 454, data of the size of the first referenced data block can be retrieved from the transport layer. At 456, metadata associated with the first referenced data block can be retrieved. The metadata can indicate, for example, the size and data type of the first referenced data block. In some implementations, metadata is retrieved before corresponding data is retrieved from the transport layer. The first referenced data block can include only non-pointer data or can include one or more pointers.

At 458, data from the transport layer corresponding to the first referenced data block can be written to a receiving system memory area. When the receiving system memory area is not preallocated, a receiving system memory area of the size of the first referenced data block can be allocated and the data from the transport layer can be written to the newly allocated memory area. In this example, a pointer value that is located in the receiving system memory adjacent to (e.g., immediately following) the first portion of the first data block can be updated to include the value of the newly allocated memory area that includes the data of the first referenced data block. When the first referenced data block also includes one or more pointers, a determination can be made as such, at 460, and processing for a data block referenced by a pointer included in the first referenced data block can be performed (e.g., at 462, 452, etc.).

Similar processing (e.g., recursion) can be performed when the receiving system memory layout includes multiple levels of indirection using multiple pointers. When all processing related to the first portion of the first data block and the first referenced data block is completed, processing can continue for a second portion of the first data block, at 464. For example, the second portion of the first data block can begin at a location in the first data block that begins after the first pointer and up to either the end of the first data block when the first data block does not include any additional pointers or to the next (e.g., second) pointer included in the first data block.

Figure 5A:
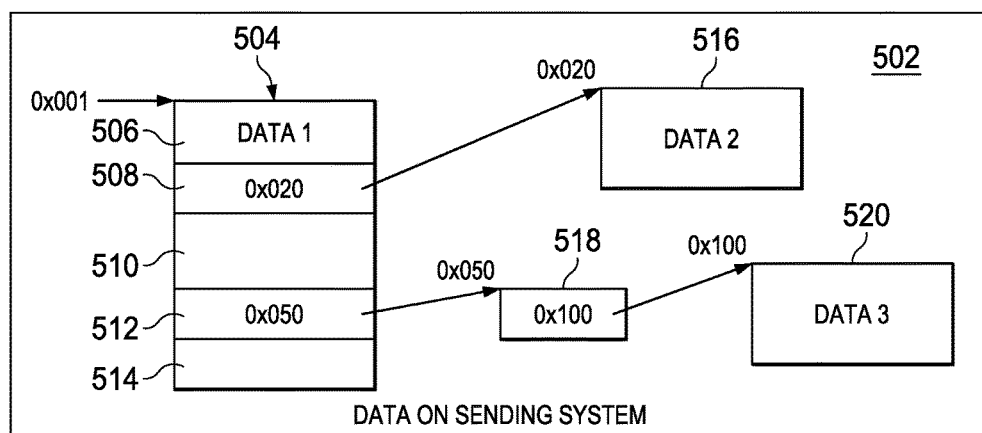

FIG. 5A illustrates a sending system memory area 502 according to an implementation. The sending system memory area 502 includes the same data as the sending system memory area 302 of FIG. 3A. A data block 504, a first data portion 506, a first direct pointer 508, a second data portion 510, an indirect pointer, 512 a third data portion 514, a first referenced data block 516, a second direct pointer 518, and a second referenced data block 520 respectively correspond to the data block 304, the first data portion 306, the first direct pointer 308, the second data portion 310, the indirect pointer 312, the third data portion 314, the first referenced data block 316, the second direct pointer 318, and the second referenced data block 320.

Figure 5B:
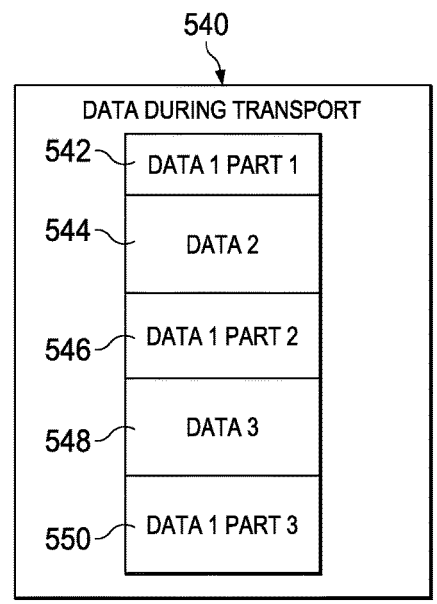
FIG. 5B illustrates an inlined data block during transport according to an implementation.

FIG. 5B illustrates an inlined data block 540 during transport according to an implementation. The inlined data block 540 illustrates, for example, the transporting by an inlining process of the data included in the sending system memory area 502 and data referred to (e.g., either directly or indirectly) by the pointers included in the sending system memory area 502. The inlined data block 540 includes a first data portion 542, a first referenced data block 544, a second data portion 546, a second referenced data block 548, and a third data portion 550, respectively corresponding to the first data portion 506, the first referenced data block 516, the second data portion 510, the second referenced data block 520, and the third data portion 514.

The inlined data block 540 does not include the values of the first direct pointer 508, the indirect pointer 512, or the second direct pointer 518. Rather, the receiving system inlines data and the inlining process includes referenced data in the inlined data block 540 without including values of associated pointers that refer to the referenced data. The inlining process can, for example, retrieve the data block 504 from the sending system memory area 502, and write data from the data block 504 to the transport layer starting from the beginning of the data block 504 until the inlining process encounters a pointer value (e.g., the first direct pointer 508), e.g., as illustrated by the inclusion of the first data portion 542 in the inlined data block 540.

The inlining process can process the data referenced by the first direct pointer 508 (e.g., the first referenced data block 516). The inlining process can write data from the first referenced data block 516 to the transport layer (e.g., as illustrated by the inclusion of the first referenced data block 544 in the inlined data block 540), starting from the beginning of the first referenced data block 516 until either a pointer or the end of the first referenced data block 516 is reached (e.g., the end of the first referenced data block 516 being reached in this example).

The inlining process can continue processing the data block 502 and can write data to the transport layer starting from the start of the second data portion 510 until a pointer value (e.g., the indirect pointer 512) is encountered, e.g., as illustrated by the inclusion of the second data portion 546 in the inlined data block 540. The inlining process can process the data referenced by the indirect pointer 512 (e.g., the second direct pointer 518). Since the data referenced by the indirect pointer 512 is a pointer, the inlining process can process the data referenced by the second direct pointer 518 (e.g., the second referenced data block 520). The inlining process can write data from the second referenced data block 520 to the transport layer (e.g., as illustrated by the inclusion of the second referenced data block 548 in the inlined data block 540), starting from the beginning of the second referenced data block 520 until either a pointer or the end of the second referenced data block 520 is reached (e.g., the end of the second referenced data block 520 being reached in this example). The inlining process can continue processing the data block 502 and can write data to the transport layer (e.g., as illustrated by the inclusion of the third data portion 550 in the inlined data block 540), starting from the start of the third data portion 514 until the end of the third data portion 514 is reached.

Figure 5C:
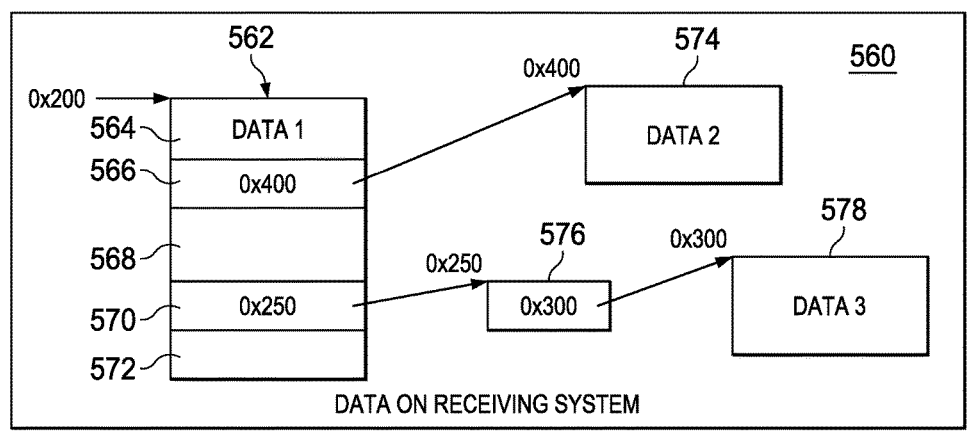

FIG. 5C illustrates a receiving system memory area 560 according to an implementation. The receiving system memory area 560 illustrates the results of receiving and processing the inlined data block 540 on a receiving system. The receiving system memory area 560 includes the same data as the receiving system memory area 360 of FIG. 3C. A data block 562, a first data portion 564, a first direct pointer 566, a second data portion 568, an indirect pointer 570, a third data portion 572, a first referenced data block 574, a second direct pointer 576, and a second referenced data block 578 respectively correspond to the data block 362, the first data portion 364, the first direct pointer 366, the second data portion 368, the indirect pointer 370, the third data portion 372, the first referenced data block 374, the second direct pointer 376, and the second referenced data block 378.

The receiving system can retrieve metadata associated with the inlined data block 540 (and/or metadata associated with the data block 562). In some implementations, the receiving system allocates memory for the data block 562 in response to receiving the inlined data block 540. In some implementations, the data block 562 already exists in memory when the inlined data block 540 is received. The receiving system can retrieve the first data portion 542 from the inlined data block 540 and write the contents of the first data portion 542 to the first data portion 564 of the receiving system memory area 560.

The receiving system can determine from the retrieved metadata that the data block 562 is to include a pointer value in the first direct pointer 566 which points to an allocated memory area that is the size of the first referenced data block 544. The receiving system can allocate a memory block (e.g., the first referenced data block 574) equal to the size of the first referenced data block 544, set the value of the first direct pointer 566 equal to the address of the first referenced data block 574, and write the contents of the first referenced data block 544 to the first referenced data block 574.

In some implementations, when the inlined data block 540 is received, the data block 562 and the first referenced data block 574 already exist in receiving system memory and the first direct pointer 566 already includes the address of the first referenced data block 574. In this example, the receiving system can write the contents of the first referenced data block 544 to the first referenced data block 574 without allocating additional memory and without updating the first direct pointer 566.

The receiving system can write the contents of the second data portion 546 to the second data portion 568 and can write the contents of the third data portion 550 to the third data portion 572. The receiving system can determine from the retrieved metadata that the data block 562 is to include a pointer value in the indirect pointer 570 which points to another pointer value. In implementations in which receiving system memory for the inlined data block 540 is not pre-allocated, the receiving system can allocate a memory area (e.g., the second direct pointer 576) equal to the size of a receiving system memory address. The receiving system can set the value of the indirect pointer 570 equal to the address of the second direct pointer 576 (e.g., an address value of "0x250").

The receiving system can determine, from the retrieved metadata that the second direct pointer is to point to a memory area of the size of the second referenced data block 548. In implementations in which receiving system memory for the inlined data block 540 is not preallocated, the receiving system can allocate a memory area (e.g., the second referenced data block 578) and can set the value of the second direct pointer 576 to the address (e.g., an address value of "0x300") of the second referenced data block 578. In implementations in which receiving system memory for the inlined data block 540 is preallocated, the receiving system can write the contents of the second referenced data block 550 to the second referenced data block 578 without allocating memory for the second referenced data block 578 or the second direct pointer 576 and without updating the indirect pointer 570 or the second direct pointer 576.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:
1. A computer-implemented method comprising:
   determining, by a computer of a sending system, that data is available for serialization using an inlining transfer process;
   retrieving a data block of the data from a memory of the sending system, wherein the memory of the sending system is different from a memory of a receiving system;
   retrieving metadata corresponding to the data block, the metadata identifying a memory layout of a receiving system corresponding to the inlining transfer process;
   writing a first portion of the data block to a transport layer, the first portion of the data block starting from a beginning of the data block and ending at a position in the data block, the position corresponding to a found pointer value in the data block;
determining, based on the found pointer value, that a pointer was found in the data block; and
recursively restarting the method using data referenced in the memory of the sending system by the found pointer value as available data, without writing the found pointer value to the transport layer.

2. The method of claim 1, comprising obtaining the next portion of the data block beginning at a next position following the found pointer value and ending either at the end of the data block or at a next found pointer value.

3. The method of claim 2, wherein the next portion of the data block ends at the end of the data block and a determination is made whether additional data is available for serialization using the inlining transfer process.

4. The method of claim 3, comprising:
writing the next portion of the data block to the transport layer block; and
determining that a pointer value was not found in the next portion of the data block.

5. The method of claim 1, comprising, on the receiving system:
determining, by a computer of a receiving system, that data is available in a transport layer for serialization using an inlining transfer process;
retrieving a data block of the data from the transport layer; and
retrieving metadata corresponding to the retrieved data block.

6. The method of claim 5, comprising writing a first portion of the data block to a memory area of the receiving system, the first portion of the data block from the beginning of the data block and ending at a position corresponding to a found pointer value.

7. The method of claim 6, comprising:
determining, based on the found pointer value, that a pointer was found in the data block;
recursively restarting the method on the receiving system; and
retrieving a next data block from the transport layer of a size corresponding to the data block referenced by the found pointer.

8. A non-transitory, computer-readable medium storing one or more computer-readable instructions executable by a computer and configured to perform operations comprising:
determining, by a computer of a sending system, that data is available for serialization using an inlining transfer process;
retrieving a data block of the data from a memory of the sending system, wherein the memory of the sending system is different from a memory of a receiving system;
retrieving metadata corresponding to the data block, the metadata identifying a memory layout of a receiving system corresponding to the inlining transfer process;
writing a first portion of the data block to a transport layer, the first portion of the data block starting from a beginning of the data block and ending at a position in the data block, the position corresponding to a found pointer value in the data block;
determining, based on the found pointer value, that a pointer was found in the data block; and
recursively restarting the method using data referenced in the memory of the sending system by the found pointer value as available data, without writing the found pointer value to the transport layer.

9. The non-transitory, computer-readable medium of claim 8, comprising or more instructions to obtain the next portion of the data block beginning at a next position following the found pointer value and ending either at the end of the data block or at a next found pointer value.

10. The non-transitory, computer-readable medium of claim 9, wherein the next portion of the data block ends at the end of the data block and one or more instructions determine whether additional data is available for serialization using the inlining transfer process.

11. The non-transitory, computer-readable medium of claim 10, comprising one or more instructions to:
write the next portion of the data block to the transport layer; and
determine that a pointer value was not found in the next portion of the data block.

12. The non-transitory, computer-readable medium of claim 8, comprising, on the receiving system, one or more instructions to:
determine, by a computer of a receiving system, that data is available in a transport layer for serialization using an inlining transfer process;
retrieve a data block of the data from the transport layer; and
retrieve metadata corresponding to the retrieved data block.

13. The non-transitory, computer-readable medium of claim 12, comprising one or more instructions to write a first portion of the data block to a memory area of the receiving system, the first portion of the data block from the beginning of the data block and ending at a position corresponding to a found pointer value.

14. The non-transitory, computer-readable medium of claim 13, comprising one or more instructions to:
determine, based on the found pointer value, that a pointer was found in the data block;
recursively restart the method on the receiving system; and
retrieve a next data block from the transport layer of a size corresponding to the data block referenced by the found pointer.

15. A computer-implemented system, comprising:
a memory of a sending system different from a memory of a receiving system;
at least one hardware processor interoperably coupled with the memory of the sending system and the memory of a receiving system and configured to perform operations comprising:
determining, by a computer of a sending system, that data is available for serialization using an inlining transfer process;
retrieving metadata corresponding to the data block, the metadata identifying a memory layout of a receiving system corresponding to the inlining transfer process;
writing a first portion of the data block to a transport layer, the first portion of the data block starting from a beginning of the data block and ending at a position in the data block, the position corresponding to a found pointer value in the data block;
determining, based on the found pointer value, that a pointer was found in the data block; and
recursively restarting the method using data referenced in the memory of the sending system by the found pointer value as available data, without writing the found pointer value to the transport layer.

16. The computer-implemented system of claim 15, comprising or more instructions to obtain the next portion of the data block beginning at a next position following the found pointer value and ending either at the end of the data block or at a next found pointer value.

17. The computer-implemented system of claim 16, wherein the next portion of the data block ends at the end of the data block and one or more instructions determine whether additional data is available for serialization using the inlining transfer process.

18. The computer-implemented system of claim 17, comprising one or more instructions to:
   write the next portion of the data block to the transport layer; and
   determine that a pointer value was not found in the next portion of the data block.

19. The computer-implemented system of claim 15, comprising, on the receiving system, one or more instructions to:
   determine, by a computer of a receiving system, that data is available in a transport layer for serialization using an inlining transfer process;
   retrieve a data block of the data from the transport layer; and
   retrieve metadata corresponding to the retrieved data block.

20. The computer-implemented system of claim 19, comprising one or more instructions to:
   write a first portion of the data block to a memory area of the receiving system, the first portion of the data block from the beginning of the data block and ending at a position corresponding to a found pointer value;
   determine, based on the found pointer value, that a pointer was found in the data block;
   recursively restart the method on the receiving system; and
   retrieve a next data block from the transport layer of a size corresponding to the data block referenced by the found pointer.

* * * * *